April 19, 1927. 1,625,744
F. REMY
ELECTRIC TRACTION SYSTEM FOR AGRICULTURAL IMPLEMENTS
Filed April 19, 1926

Inventor:
Franz Remy

Patented Apr. 19, 1927.

1,625,744

UNITED STATES PATENT OFFICE.

FRANZ REMY, OF FOSSES-LEZ-NAMUR, BELGIUM.

ELECTRIC-TRACTION SYSTEM FOR AGRICULTURAL IMPLEMENTS.

Application filed April 19, 1926, Serial No. 103,132, and in Belgium April 28, 1925.

It is known to use mechanical tractors, in the place of animal traction for example, for tilling the soil. These internal combustion engine tractors, which draw ploughs or any other agricultural implements, have the advantage that they reduce the cost of exploitation and considerably increase the effective yield owing to the speed with which the work is done. These tractors have the great disadvantage, among others, however, that owing to their considerable weight they compress the soil unduly and require enormous engine power to move their own weight.

The present invention has for its object to overcome these disadvantages whilst at the same time giving the advantages of the tractor, and to obtain an increase in working speed over any mechanical power heretofore employed.

The present invention provides a practical and rational electric traction for agriculture and consists in a cable or band placed on the ground to be worked on and containing the two conducting wires (positive and negative). These conductive wires are in intimate contact with a trolley connected to an electric motor carried by the agricultural implement to be driven (plough, harrow, roller, etc.). The trolley is provided with two rollers between which the conducting band engages in such a manner that it is always in intimate contact with the trolley, the band being supported on the ground.

The conducting band which contains the two conducting wires is supported on the ground, and in order to avoid short circuit and earth currents, the band has its edges formed with openings to receive the positive and negative wires, respectively. The conducting wires of the band described are carried by carriages which run on fixed aerial cables in such a manner that the conducting band moves automatically along the whole length of the ground on which the work is to be done by running along the length of the aerial conducting wires.

An embodiment of the present invention is shown by way of example in the drawing.

The invention comprises a flexible band $a$ which is of elongated section to prevent the band from twisting and to provide the greatest possible contact surface for the contactor trolley.

Figure 4:
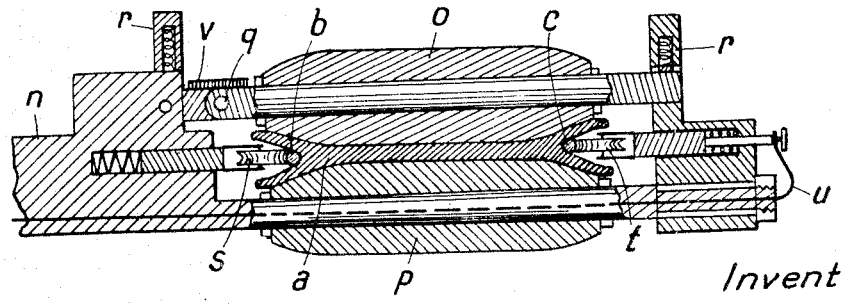
Figure 4 is a vertical section through the end of the trolley in which the conducting band engages.

The band has its lateral edges formed with openings as clearly shown in Figure 4 and the conducting wires $b$ and $c$ are introduced into the recesses thus provided. The wires $b$ and $c$ are connected to carriages $d$ and $e$ having rollers $f$, $g$ which are supported on the fixed aerial wires $h$, $i$. These wires are carried by brackets $j$ each forming part of a post $k$ of suitable height.

The current may be produced by a power station or by a generating set according to circumstances.

Figure 1:
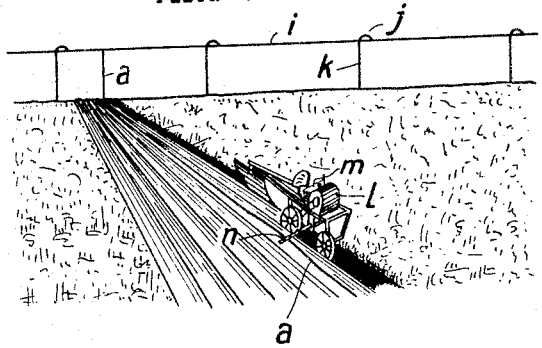
Figure 1 is a diagrammatic view of a strip of land to which electric traction is applied in accordance with the present invention.
Figure 2:
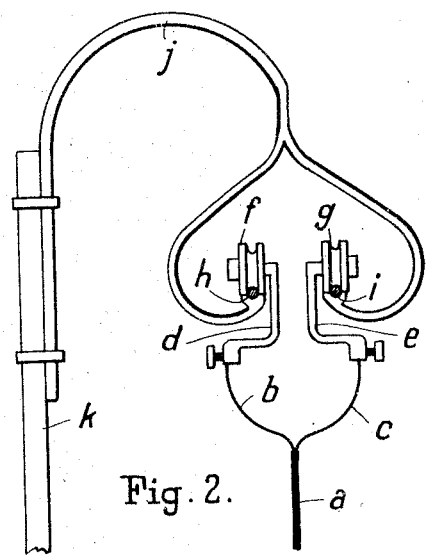
Figure 2 is a sectional view of the fixed aerial conducting wires carried by posts, carriages connected to the conducting band being movable along these aerial wires.
Figure 3:
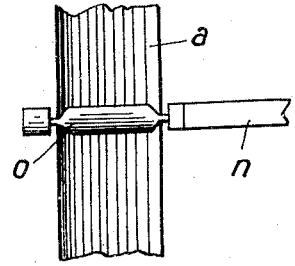
Figure 3 shows a part of the conducting band and trolley in plan.

As shown in Figure 1, the plough carries an electric motor $l$ and a controller $m$, the motor driving a driving wheel of the plough. It is to be understood that this plough is given by way of example only, the design of the plough forming no part of the invention. The plough shown is a simple Belgian plough which may be suitable for the work required, but double or turnwrest Belgian ploughs and multiple furrow ploughs may also be used.

The trolley $n$ carries two movable rollers $o$ $p$ at its end, which are disposed parallel to one another and in the same vertical plane (Figure 1) and have a space between them corresponding to the section of the conducting band $a$. The shaft of the roller $p$ is fixed as is also that of the roller $o$, and can swivel about a pivot $q$, thus enabling the band $a$ to be introduced between the two rollers at the commencement of the traverse and to be removed when it is no longer required to use the agricultural implement. A locking member $v$ gives the shaft the necessary rigidity when a foreign body, such as a stone for example adheres to the band. The shaft of the roller $o$ is held at both ends by a coiled spring $r$ which allows some play and thus prevents the band $a$ from being clamped too tightly between the rollers $o$, $p$.

Contact wheels $s$ and $t$ are resiliently mounted between the two rollers in order to obtain contact, the first being connected to the wire $b$ to lead the negative current to the frame of the machine for example, whilst the second is connected to the wire $c$ to lead the positive current through a well insulated cable $u$ to the motor $l$.

The motor $l$ may be detachably mounted on the agricultural implement so that the same motor can be applied to different implements such as a plough, harrow, roller, etc.

The present invention has been described by way of indication only and not limitation and it is obvious that numerous modifications can be made in its details without departing from its spirit.

I claim:—

1. In an electric traction system for agricultural implements, a pair of fixed aerial conductors, current collecting elements movable along said conductors, a connecting cable supported on the ground and connected to said collector elements and means movable along said cable for collecting current therefrom.

2. An electric traction system according to claim 1 wherein said cable consists of a band of insulating material of flat cross section having parallel edges formed with recesses, electric conductors being mounted in said recesses.

3. In an electric traction system for agricultural implements a flexible connecting cable consisting of a band of insulating material formed with recesses and having conductors mounted in said recesses and a collector movable along the length of said band and provided with conductor elements for making electrical contact with said conductors.

4. In an electric traction system for agricultural implements, a flexible connecting cable consisting of a band of insulating material formed with recesses and having conductors mounted in said recesses, and a trolley movable along the length of said band and consisting of a pair of rollers, means for urging said rollers resiliently into engagement with said band, a pair of collectors for making electric contact with said conductors and means for urging said collectors resiliently into contact with said conductors.

5. An electric traction system for agricultural implements according to claim 4 wherein one of said rollers is movable for disengaging said trolley from said band.

6. An electric traction system for agricultural implements comprising fixed aerial conductors, current collecting elements movable along said conductors, a connecting cable supported on the ground and connected to the said collector, said cable being made of insulating material and formed with recesses and having conductors disposed in said recesses and a detachable collector movable along said cable and provided with conductor elements for collecting current from the conductors of said cable.

Brussels, this seventh day of April, 1926.

FRANZ REMY.